Dec. 16, 1958 H. W. CHRISTENSON ET AL 2,864,473
TRANSMISSION
Filed Dec. 28, 1955
2 Sheets-Sheet 1
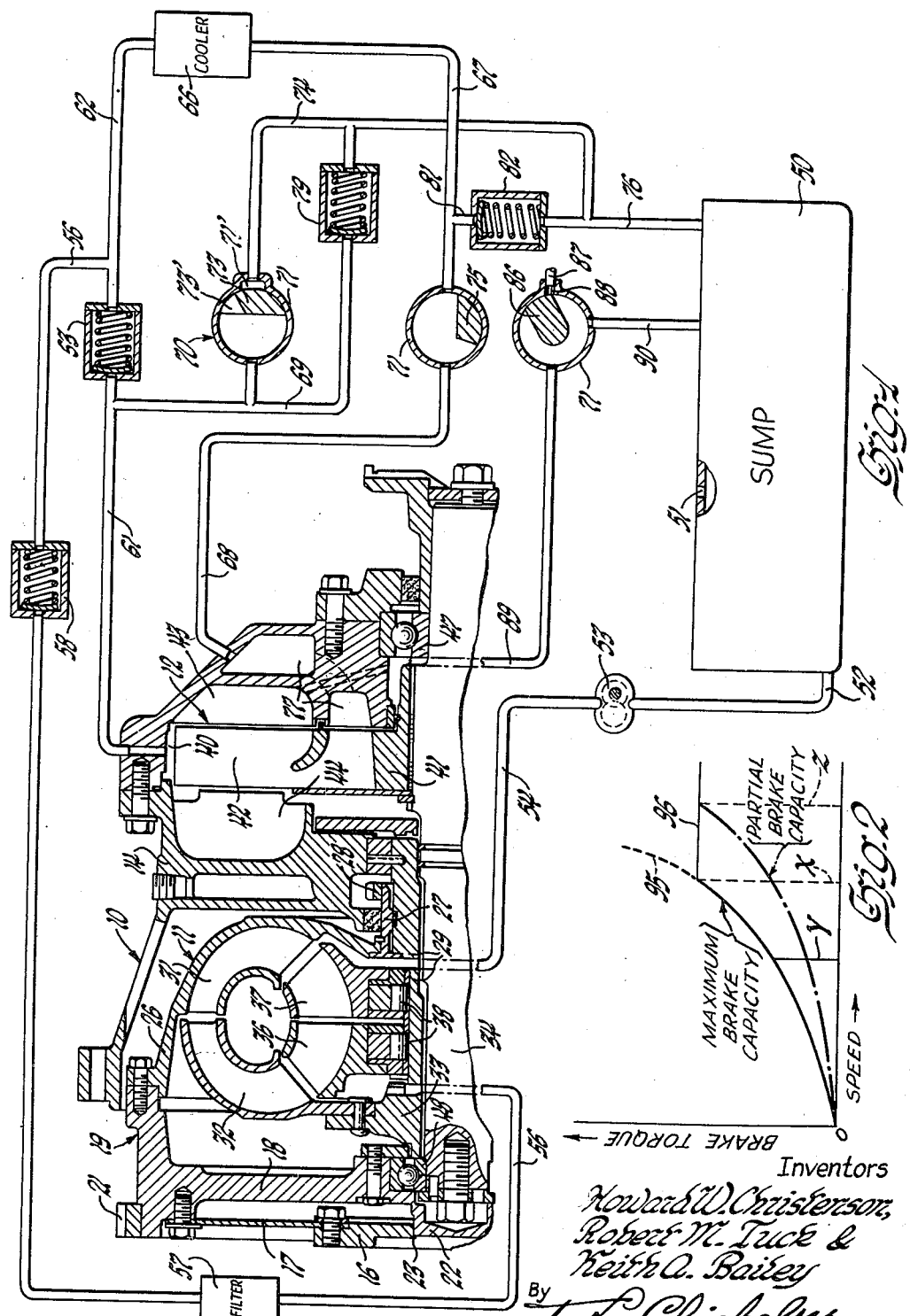
Inventors
Howard W. Christenson,
Robert M. Tuck &
Keith O. Bailey
By T. L. Chisholm
Attorney

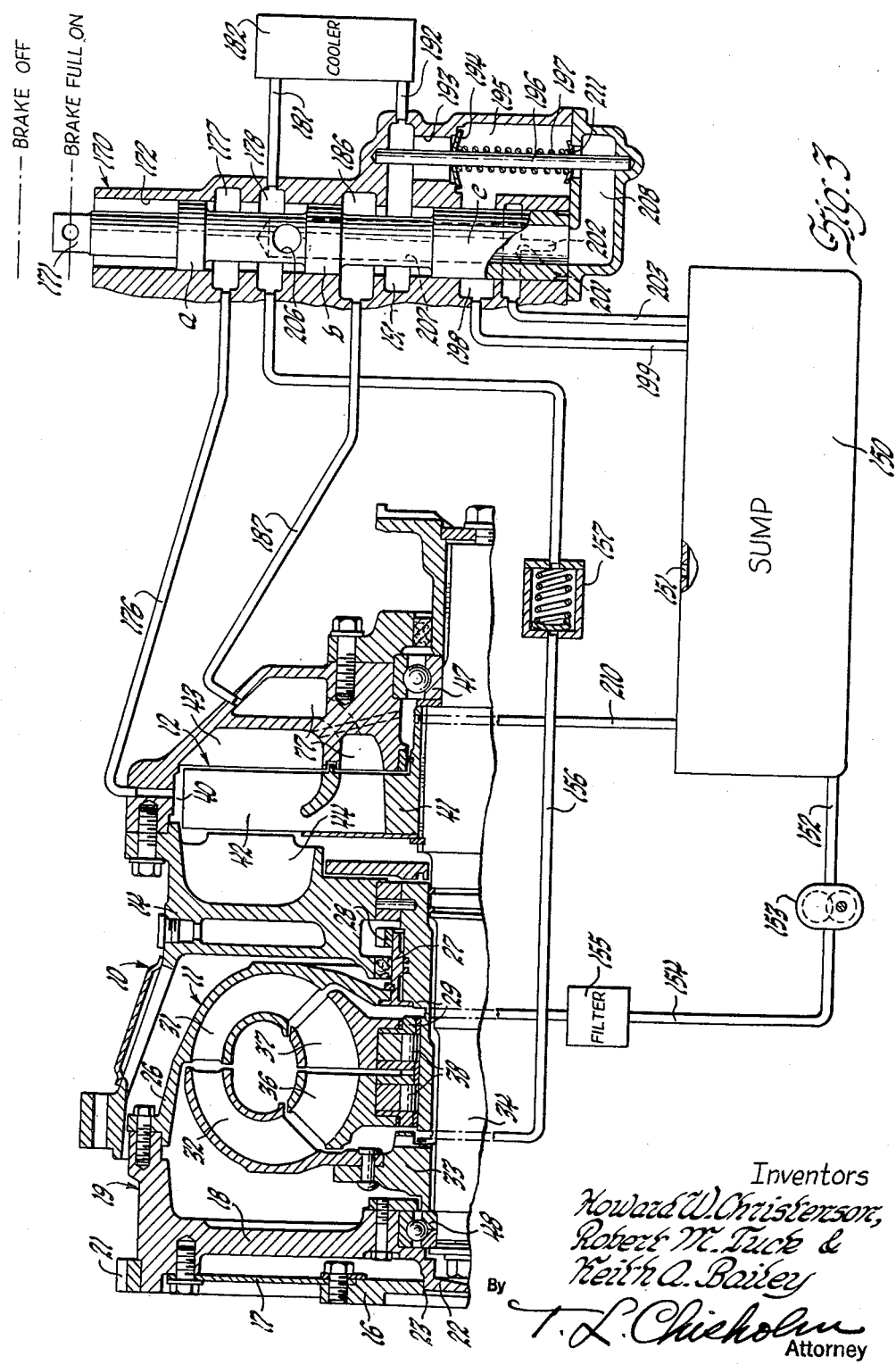

United States Patent Office 2,864,473
Patented Dec. 16, 1958

2,864,473

TRANSMISSION

Howard W. Christenson and Robert M. Tuck, Indianapolis, and Keith A. Bailey, Speedway City, Ind., assignors to General Motors Corporation, Detroit, Mich., a corporation of Delaware Application December 28, 1955, Serial No. 555,847

22 Claims. (Cl. 192—4)

This invention relates to a transmission having a hydrodynamic brake and control system and more particularly a loop circuit control system for a hydrodynamic brake.

The hydrodynamic brake may be employed in a transmission including a hydrokinetic torque converter having a fluid supply system providing a volume of fluid proportional to speed. The exhaust from the torque converter may then be used as the fluid supply for the brake. When the brake is supplied with fluid, the brake absorbs torque, and the fluid is ejected under pressure through a hydraulic loop circuit having manual and automatic valves to control the brake capacity and a restriction provided by a cooler and returned to the brake chamber. Fluid is continuously supplied to the loop circuit and is released from the loop circuit to control the brake capacity. The maximum brake capacity in the full brake range, which increases with brake speed, is obtained when the brake chamber is full and the pressure in the chamber is controlled by a regulator valve located between the restriction and the brake inlet which is closed to fill the brake chamber and opened by pressure in the brake inlet line to limit the pressure in the full brake chamber. The maximum brake capacity in the limited brake range, which is a constant value, is obtained by a torque limiter or relief valve located between the restriction and the brake outlet which limits the pressure in the brake chamber and the brake capacity to a constant safe value at all speeds. The manual valve controls the size of an orifice to control the release of fluid from the loop circuit at a point between the restriction and the brake outlet to partially evacuate the brake chamber to provide partial brake capacity which may increase with speed to the limited maximum brake capacity. Though the brake capacity varies with speed, the same size orifice will provide the same brake capacity for a given speed because the system is stable, since a change in brake capacity will change the amount of fluid released to counteract the change in brake capacity.

The manual control valve in the brake off position evacuates the brake and permits the converter exhaust to continue to flow through the cooler. The regulator valve is closed to fill the brake chamber and may open to limit the pressure in the brake chamber when full to provide the maximum brake capacity in the full brake range and also controls the pressure in the converter chamber.

An object of the invention is to provide a stable control for a hydrodynamic brake employed in combination with a torque converter wherein fluid supplied from the torque converter is constantly added and released from the brake circuit to maintain the desired braking effect.

Another object of the invention is to provide in a circuit for a hydrodynamic brake employed in combination with a torque converter, the torque converter providing a supply of fluid for the circuit and manually set automatic controls to maintain the braking effect and automatic means to limit the maximum braking effect.

Another object of the invention is to provide in combination, a torque converter and hydrodynamic brake, a control system for the hydrodynamic brake wherein the torque converter outlet fluid is employed as a source of supply for the brake control system.

Another object of the invention is to provide in combination, a cooling system and a hydrodynamic brake control system employing the same fluid supply and cooler.

These and other objects and advantages of the invention will be apparent from the following description and drawing of the preferred embodiments of the invention.

Fig. 1 is a diagrammatic view of a torque converter and a hydrodynamic brake with a control circuit having a rotary control valve.

Fig. 2 is a view showing characteristic curves for these hydrodynamic brakes and control systems.

Fig. 3 is a similar diagrammatic view with a control circuit having a reciprocating control valve.

The transmission 10 has a torque converter unit 11 and a hydrodynamic brake unit 12 mounted in the transmission housing 14. The transmission is driven from an engine output shaft having a flange 16 suitably connected by a flexible disk 17 to the flywheel portion 18 and impeller portion 26 of the torque converter housing 19. The torque converter housing 19 acts as a flywheel and the forward portion 18 supports the starter gear 21. The central part of the flywheel 18 has a forwardly projecting pilot bearing 22 extending into the coaxial bore 23 in the engine shaft to support the converter housing in alignment with the engine shaft. The bladed converter impeller 26 has a forward edge secured to the flywheel 18 and a rear wall which extends inwardly to ground sleeve 29 where it is secured to the pump drive sleeve 27 carrying the pump drive gear 28 which are rotatably supported on ground sleeve 29. The impeller 26 has an annular series of impeller blades 31. The bladed turbine 32 is mounted on hub 33 fixed on converter output shaft 34. The stators 36 and 37 each having torque reaction blades are mounted by one-way overrunning clutch devices 38 on the ground sleeve 29 which is fixed to the housing 14. The impeller 31, turbine 32 and stators 36 and 37 provide a conventional torque converter having a converted chamber.

The output shaft 34 is keyed to the hydrodynamic brake rotor 41 having an annular series of impeller vanes 42 which rotate in brake chamber 40 between the fixed vanes 43 and 44 which are mounted on the transmission housing 14 and projecting into chamber 40. The output shaft 34 is supported at the rear of transmission housing 14 by the bearing 47 and at the forward end by a bearing 48 mounted in the flywheel 18.

The brake control system is supplied with fluid, usually oil, from a fluid supply or sump 50 having a vent 51 connected by pump inlet line 52 to the positive displacement pump 53 which is driven by gear 28 to supply fluid to the converter feed line 54. If the pump has a relief valve, it is set to relieve at a high pressure so the converter pressure is controlled, as explained below, by pressure regulator valve 82 and thus acts only as a safety valve. The fluid leaves the converter through converter outlet line 56 which may have a filter 57 and a one-way check valve 58. The hydrodynamic brake rotor 42 acting as a centrifugal pump, pumps fluid out of the chamber 40 and into a tangential port leading to the brake outlet line 61 which is connected through the check valve 63 to cooler inlet line 62. The converter outlet line 56 is also connected to the cooler inlet line 62 which is connected to the cooler 66 which not only functions to cool the fluid but to provide a restriction in the brake loop circuit. The outlet of cooler 66 is connected to the cooler outlet line 67 and brake inlet line 68 which returns the fluid via passage 77 to brake chamber 40.

The system is manually controlled by a rotary valve 70 having a cylindrical housing 71 and a rotary valve having three land portions illustrated in sectional views at 73, 75 and 86 in the brake on position. Movement of the valve 70 in a clockwise direction, 90 degrees, places the valve in the brake off position. The brake outlet line 61 has a branch line 69 which is connected to the manually controlled valve 70 and in the brake on position blocked by brake outlet control land 73. When the valve 70 is in the brake off position, line 69 is connected by the sump line 74 and main sump line 76 to sump 50 to drain brake chamber 40 to release the brake. The land 73 has a slot 73′ having substantially the same circumferential dimension as the cooperating port 71′ for line 74. The axial dimension of the slot is narrower than the port 71′ so that as the valve moves from the brake full on or wide open position, a gradually decreasing orifice is provided until in the brake off position the valve is closed stopping flow between lines 69 and 74. A parallel branch of the line 69 is connected to torque limiter valve 79 which will relieve excessive pressure in the brake out line to limit the pressure and maximum braking effect or torque capacity to a safe value and by-pass the fluid through line 74 and line 76 to the sump 50. The cooler outlet line 67 is connected to the brake inlet port portion of the control valve 70 where land 75 in the brake on position illustrated connects line 67 through valve 70 to brake inlet line 68 and passage 77 to supply fluid to the brake chamber 40. The cooler outlet line 67 is connected by branch 81 and the pressure regulator or relief valve 82 to the main sump line 76 to permit flow of fluid from the converter through the loop system to the sump when the land 75 is closed to limit the converter pressure. The valve 70 has a scavenge land 86 which in the brake on position illustrated which closes the air pressure supply line 87 having an orifice 88 and connects the brake vent line 89 through the valve to sump vent line 90 to the sump 50 to provide air communication between the brake and atmosphere via the sump. In the brake off position land 86 blocks line 90 and connects air pressure line 87 to brake vent line 89 to augment brake chamber scavenging.

*Operation*

When the transmission is operating, pump 53 supplies fluid under pressure from sump 50 through the line 54 in relation to impeller shaft speed to keep the torque converter 11 filled so that the converter can hydrokinetically multiply or transmit torque to the output shaft 34. When the control valve 70 is rotated 90 degrees in a clockwise direction, it is in the brake off position, and the fluid from the converter flows through line 56, cooler inlet line 62 where the check valve 63 prevents flow into the brake outlet line 61 toward the brake chamber. The fluid from the converter flows via lines 56 and 62 through the cooler 66 to the cooler outlet line 67 where it is blocked by the valve land 75. As the pressure rises in line 67, the regulator valve 82 opens releasing fluid in line 67 through branch 81, valve 82 and sump line 76 to sump 50 to regulate the pressure in the converter. Due to the restriction of the cooler, the converter pressure will be higher than the pressure in line 81.

In the brake off position the brake outlet control land 73 of valve 70 is full open and permits the brake chamber 40 to be exhausted via the brake outlet line 61, line 69, valve 70 and sump lines 74 and 76 to sump 50. If the sump 50 is located below or near the level of the brake chamber 40, the centrifugal action of the brake rotor 41 will be sufficient to eject the fluid from the brake chamber 40 to sump 50 and the vent lines 89 and 90 will conduct air from the sump which is open to atmosphere to the brake chamber. Since the vent lines may be open at all times when air scavenging is not needed, land 86 is not needed. However, when the vehicle requires that the sump 50 be placed substantially above the level of the hydrodynamic brake 12, forced air scavenging is required to lift the fluid to completely evacuate the brake chamber to prevent drag. With the valve 70 in brake off position, the valve land 86 closes the vent line 90 extending to the sump 50 and conducts air from air supply line 87 through line 89 to brake chamber 40. When the air scavenging system is employed, the air entering chamber 40 forces the fluid which is pumped by the brake rotor to the tangential port for line 61 through lines 61 and 69, valve land 73 and lines 74 and 76 to sump 50. The tangential port may be at the bottom of chamber 40 to aid complete evacuation. Any source of air under pressure may be used such as the air brake supply. Since only a small quantity of air is required to scavenge the chamber, an orifice 88 restricts the air flow in line 87 to limit the drain on the source though the line is open when the brake is released.

When it is desired to fully engage the brake, the valve 70 is rotated to the brake on position to locate each of the three lands 73, 75 and 86 as shown in Fig. 1. The land 86 closes the air inlet 87 to discontinue the scavenging of brake chamber 40 and connects vent line 89 past land 86 to drain line 90 and vented sump 50 to connect the center of brake chamber 40 to atmosphere to vent the air displaced by incoming fluid. The valve 70 at land 75 is opened and connects the cooler outlet line 67 to the brake inlet line 68 so that the converter exhaust flow via converter outlet line 56 is delivered to the brake chamber 40 to fill the hydrodynamic brake. Since the vehicle is normally coasting when the brake is applied, the positive drive pump will supply a volume of fluid substantially in proportion to brake speed via line 56 to the brake circuit. The fluid supply for these control systems should be substantially constant at a given speed but may vary with brake speed which will merely change the slope of the brake capacity curves but still provide stable control. The brake pumps fluid out of chamber 40 through a hydraulic loop circuit or through line 61, check valve 63, line 62 where it joins the converter outlet flow, cooler 66, lines 67 and 68 and passage 77 and returns the fluid to the brake chamber 40. The check valve 63 prevents converter fluid flowing back via brake outlet line 61 to the brake chamber 40 and check valve 58 insures a positive pressure in the converter chamber to supply lubrication to the converter and any connected lubrication line. With the valve 70 in the full brake on position illustrated in Fig. 1 the valve 70 at land 73 completely closed the by-pass from brake outlet line 61 via branch 69 to the sump line 74. Under these conditions, the entire fluid supply from the converter outlet line 56 will enter the brake chamber until the maximum capacity for the brake speed is attained as indicated by the maximum brake capacity curve, Fig. 2.

As the brake chamber is filled with fluid, the brake capacity increases and the pressure in the hydraulic brake circuit increases. When the brake chamber is full, the maximum brake capacity at any speed within the full brake range from 0 to X (Fig. 2) speed is attained, as indicated by the maximum brake capacity curve. When the brake chamber 40 is full, there is a positive pressure in the inlet portion of the loop circuit between the restriction provided by the cooler 66 and the brake chamber inlet or lines 67, 68 which is relieved by pressure regulator valve 82 since the regulator valve 82 is set to relieve at a pressure lower than the pressure at which torque limiter valve 79 relieves minus the pressure drop due to the restriction of the cooler 66. Thus the maximum brake capacity is maintained in the full brake range by valve 82 which keeps the brake chamber full and limits the maximum pressure in the brake chamber by maintaining a constant pressure in line 67 when the brake chamber is full.

The brake torque increases with increasing vehicle speed and increasing volume of fluid in the brake chamber. Since the braking torque increases as the second power of the speed, the brake capacity will increase rapidly at high speeds as shown in Fig. 2 by the dotted portion 95 of the maximum brake capacity curve and the brake will generate a dangerous pressure or absorb more torque than the vehicle drive mechanism is designed to transmit. In order to avoid overloads, the maximum capacity of the brake is limited to a safe value. Since the pressure in the brake outlet portion of the loop circuit between the brake chamber outlet and the restriction is a measure of the torque being absorbed by the hydrodynamic brake, the maximum capacity is limited to a safe maximum capacity in the limited brake range above X speed as indicated by the horizontal portion 96 of the maximum brake capacity curve by connecting the brake out line 61 via branch 69 to the torque limiter valve 79 which limits pressure in the brake chamber to the desired safe maximum pressure to limit the torque capacity. When this pressure is exceeded, the valve 79 opens and drains fluid from brake chamber 40 via lines 61 and 69, sump lines 74 and 76 to the sump 50 to partially evacuate the brake chamber and thus the braking by limiting the pressure in the brake outlet line 61.

The brake may also be manually controlled to vary the braking effect or to set the brake for any partial braking effect. Between the full on position and the full off position of valve 70, the land 73 provides a variable orifice opening between the brake outlet portion of the loop circuit and the sump or lines 69 and 74 to provide partial braking. During partial braking operation land 75 connects line 67 to 68 to supply the brake and land 86 blocks air scavenge line 87 and connects vent lines 89 and 90. The pressure regulator valve 82 and the torque limiter valve 79 are closed. The converter outlet line 56 provides a supply of fluid to the brake circuit which may be constant or vary with brake speed. When valve 70 is moved from the maximum brake position shown, the land 73 rotates clockwise and the narrow slot 73' opens port 71' to provide a gradually increasing orifice opening until at the end of the slot land 73 uncovers the full width of the port 71' in the brake off position. As the orifice increases, the by-pass flow from the brake circuit at brake outlet line 61 via branch 69, valve 70, lines 74 and 76 is increased. The partial capacity of the brake is manually determined by the size of the orifice at land 73 which automatically regulates the release of fluid from the hydraulic brake circuit to sump to partially evacuate the brake chamber to control the brake capacity. At a speed Y indicated by ordinate Y in the full brake range from 0 to X speed, a certain partial orifice opening will provide a certain brake capacity as indicated for example at the intersection of ordinate Y with one partial brake capacity curve. A change in brake speed will provide a change in brake capacity as indicated by the partial brake curve. If the size of the orifice is increased, the brake capacity will be decreased along the ordinate Y and conversely if the size of the orifice is decreased the brake capacity will be increased along the ordinate Y. If the speed varies the brake capacity will vary in accordance with a curve similar to and located above or below the illustrated partial brake capacity curve. For any orifice size of the land 73 a restriction is established which in turn establishes a fixed braking capacity which is capable of producing due to the pressure in the brake outlet a flow through the orifice equal to the flow of the fluid supply to the brake loop circuit. Thus the orifice opening determines or maintains a certain brake capacity at a certain speed. The brake capacity increases with increasing speed in accordance with the characteristics of hydrodynamic brakes. At a fixed speed and orifice opening at land 73, the brake is automatically controlled at a certain brake capacity value because an increase in braking will increase the brake outlet pressure and force more fluid through the orifice to the sump to reduce the volume of oil in the brake chamber and reduce the brake capacity to said certain brake capacity value. Conversely a decrease in braking decreases the pressure and flow through the orifice to increase the brake capacity.

In partial capacity operation above the full brake range, for example, at speed Z in the limited brake range, a partial orifice opening would provide the brake capacity indicated at the intersection of the ordinate Z and the partial brake capacity curve. At this point the torque limiter valve 79 opens to limit the brake capacity to the value indicated by the flat portion 96 of the maximum brake capacity curve even though in partial capacity operation, the brake chamber 40 is not full the valve 82 would not open. A reduction in speed would provide a brake capacity indicated by the partial brake capacity curve.

Reciprocating valve control

The transmission and hydrodynamic brake may also be controlled to function in this manner by a control system having a reciprocating valve as illustrated in Fig. 3. The transmission 10 which includes a hydrokinetic torque converter 11 and the hydrodynamic brake 12 is the same as described above and illustrated in Fig. 1, with like reference numerals employed.

The control system illustrated in Fig. 3 has a sump 150 having a vent 151 from which fluid is supplied by the pump inlet line 152 to the pump 153 which supplies fluid under pressure in accordance with engine speed to the converter inlet line 154 which may have a filter 155 to fill the torque converter 11. The converter outlet is connected to line 156 which may have a check valve 157 to prevent flow of hot brake oil to the converter which could damage the bearings.

The manual control valve unit 170, illustrated in the brake full on position, has a reciprocating valve 171 having spaced lands $a$, $b$ and $c$ located in a bore 172 of uniform diameter in a valve body or transmission casing. With the valve 171 in full on position, as illustrated, the brake outlet line 176 connects a tangential port at the outer perimeter of the brake chamber 40, to the annular port 177 located between the lands $a$ and $b$ adjacent the land $a$. The converter outlet line 156 is connected to the annular port 178 located between the lands $a$ and $b$ adjacent the land $b$. The port 178 provides an annular passage which always connects the converter outlet line 156 to cooler inlet line 181 which connects port 178 to cooler 182 which cools the fluid and provides a restriction. The port 186 located between the lands $b$ and $c$ adjacent the land $b$ is connected by the brake inlet line 187 and passage 77 to brake chamber 40. The port 191 located between the lands $b$ and $c$ adjacent the land $c$ is connected to cooler outlet line 192 which is connected to the cooler 182. The cooler outlet line 192 is also connected by by-pass passage 193 having a pressure regulator valve 194 to the by-pass chamber 195. The valve 194, which always acts as a converter pressure regulating valve and acts when the brake is full as a brake pressure regulating valve, is slidably mounted on guide rod 196 which is fixed in the valve body and extends across chamber 195. A coil spring 197 on rod 196 engages valve 194 to hold the valve in closed position and abuts valve 211 at the other end. The by-pass chamber is always connected by port 198 and line 199 to sump 150. A T-shaped exhaust port 201 blocked by land $c$ of valve member 171 is connected by sump line 203 to the sump 150. In the space between the lands $a$ and $b$ there is an aperture 206 in the valve 171 communicating with the axial bore 207 extending to the lower end of valve 171 which connects the space between the lands $a$ and $b$ to the chamber 208 in the valve body below valve 171. The chamber 208 is connected by the torque limiter valve 211 which limits brake capacity to by-pass chamber 195. The valve 211 is guided on the rod 196 and retained in position by the spring 197 abutting valve 194. Brake chamber 40 is vented by line 210 to vented sump 150.

Operation

The operation of the reciprocating valve system of

Fig. 3 is basically the same as the rotary valve system of Fig. 1 and the brake capacity is also in accordance with the curves in Fig. 2. When the transmission is operating with the brake either on or off, pump 153 supplies fluid from sump 150 under pressure through the line 154 to the converter in relation to converter input shaft speed. When the valve 171 is in the brake off position, the converter exhaust flows through line 156 around land b of the valve 171 to the cooler inlet line 181 without permitting flow into valve bore 172 and into the brake chamber. The fluid flows through the cooler 182 to the cooler outlet line 192 where the land c blocks entrance to the port 191 and fluid under pressure opens the regulator valve 194 regulating the pressure in the converter and flows through the by-pass chamber 195 and annular port 198 which is always open regardless of the position of land c through the sump line 199 to the sump 150. In the brake off position, the brake chamber 40 is exhausted through brake outlet line 176, port 177, the space between the lands a and b, aperture 206, axial bore 207, port 201, and line 203 to the sump 150. Thus the converter and brake chambers are connected by separate paths to the sump. The brake inlet line 187 is blocked at port 191 by land c.

When the valve 171 is moved to the brake full on position illustrated in Fig. 2, the brake outlet line 176 is connected to the port 177 where it joins the converter outlet line 156 at port 178 and both enter cooler inlet line 181 to flow through cooler 182. Since the output or brake shaft 34 is generally driving the input shaft when the brake is applied, the converter acts as a coupling, and pump 153 and converter output flow in line 156 is substantially proportional to brake speed. The torque limiter valve 211 opens at a pressure higher than the pressure at which the regulator valve 194 opens plus the pressure drop in cooler 182. Thus the pressure of oil in the full brake chamber is limited in the full brake range or normal speed range from 0 to X speed by the regulator valve 194 which will open in response to the higher brake inlet pressure created by the excess oil supplied from the source to permit excess oil to drain through chamber 195, port 198 and line 199 to sump 150 to keep the brake chamber full to provide the maximum brake capacity as shown by the sloped curve in Fig. 2 and limit the pressure in the brake chamber. The converter and brake outlet lines 156 and 176 are connected through the space between the lands a and b, aperture 206 and the axial bore 207 to the chamber 208 at the lower end of valve bore 172. The pressure of the fluid in chamber 208 is substantially the same as the pressure at the outer periphery of the brake, since the flow loss in line 176 is low, and this pressure acts upwardly on the valve member 171 so that the operator of the brake will feel a force resisting his efforts to hold the valve in the brake full on position or any other partial brake on position in proportion to the torque or braking effect of the brake. If the brake tends to absorb more than the designed brake capacity at speeds above the normal range, the pressure in the brake outlet line and chamber 208 will open torque limiting valve 211 and exhaust oil through chamber 195, port 198, line 199 to sump 150. Thus excessive torque absorption by the brake is prevented above the full brake range or in the limited brake range, i. e., speed Z by the opening of valve 211 which reduces the pressure and the volume of oil in the brake chamber by removing oil from the brake circuit to provide a limited maximum brake capacity as indicated by the horizontal portion 96 of the maximum brake capacity curve in Fig. 2. Thus at any speed the maximum brake capacity is predetermined by the control system.

To provide an intermediate or partial brake capacity, the valve 171 is manually moved to a partial brake position between the brake full on and off positions so that the lower end of valve 171 will partially uncover the axial slot portion 202 of port 201 to provide a restricted orifice connecting chamber 208 to line 203 and sump 150. The orifice is varied by moving the valve 171 between full on and off positions in the same way as land 73 of Fig. 1 varies the orifice. In this way a part of the fluid is exhausted from the brake circuit through the slot 202 to the sump 150. At a certain partial orifice opening, the brake capacity varies with speed as indicated in Fig. 2 by the partial brake capacity curve, for example, at speed Y the brake capacity is indicated at ordinate Y. As in the rotary valve system of Fig. 1 with a constant orifice and speed the supply of fluid to the loop circuit will equal the exhaust to provide a stable system having a certain brake capacity. An increase in brake capacity above the partial brake capacity curve for that orifice opening will increase the brake out pressure and more fluid will pass through the orifice to sump to reduce the brake capacity to that partial brake capacity curve and conversely a reduction in brake capacity will reduce the pressure and less fluid will pass through the orifice to sump to increase the brake capacity. This autoregulation stabilizes the system. As the valve 171 is moved upwardly toward the brake off position, a greater area of the slot 202 is exposed to increase the orifice size and more fluid is exhausted to reduce the brake capacity to follow a similar lower partial brake capacity curve and conversely moving the valve toward the brake full on position decreases the orifice size to provide a similar but higher partial brake capacity curve.

During partial brake capacity operation with the valve 171 partially open providing a brake capacity varying with speed as shown, for example, by the partial brake capacity curve, the brake capacity is limited at the value indicated by the flat portion 96 of the maximum brake capacity curve. Thus at speed Z where the partial brake capacity curve intersects the portion 96 of the maximum brake capacity curve, the torque limiting valve 211 opens to release fluid from the brake circuit to further evacuate the brake chamber to limit the capacity to the value indicated by the flat portion 96 of the maximum capacity curve.

This loop control circuit employing a reciprocating valve 170 connects the brake outlet flow through line 176, valve 170, line 181, cooler 182, line 192, port 191, bore 172, port 186, line 187 and passage 77 to the brake chamber 40. The brake relief flow through the bleed passage 207, orifice port 201 and line 203, to sump 150 may be partially or fully blocked by land c of valve member 171 at port 201 to partially or fully apply the brake. The return flow at port 186 is always open when the brake is partially or fully applied and closed in brake off position. The pressure in chamber 208 which reflects the brake outlet pressure acts on valve 171 to provide feel and on valve 211 to automatically limit the brake capacity to a safe value at high speeds. The converter flow, after passing through the converter mixes with the brake outlet flow between lands 171a and b and flows to the cooler and regulator valve 194 which regulates the brake pressure in the full brake range and the converter pressure at all speeds when the valve 170 is in the brake on position and passes directly to the cooler and valve 194 which also regulates the converter pressure when the valve 170 is in the brake off position. The cooler outlet flow returns to brake chamber with the valve 170 in the brake on position and flows through valve 194 to sump 150 with the valve 170 in the brake off position.

In both systems the converter fluid flows through the cooler and a regulator valve to regulate converter pressure when the brake is off, but when the brake is applied the converter exhaust supplies the brake and a valve automatically controls maximum brake capacity by keeping the brake chamber full and limiting the pressure.

The brake capacity is further controlled by by-passing fluid from the loop circuit by a manually controlled variable orifice valve to provide partial braking and a limiting valve to limit maximum capacity to a safe value at high speeds. A control system of this type is stable so that a certain valve opening or orifice size in a given valve position will always provide a certain brake capacity at each speed as indicated by the curves in Fig. 2. Since the valves may be located in any position in or adjacent the transmission, it will be appreciated that we have employed terms like "top" and "bottom" merely to facilitate reference to the drawings.

If the regulator valves 82 or 194 are set to relieve at a pressure higher than the pressure at which the torque limiter valves 79 or 211 relieve minus the pressure drop in coolers 66 or 182 in order to provide a higher converter pressure, the pressure in the brake chamber will be relieved by the torque limiter valves 79 and 211 in the full brake range at the same pressure which these valves relieve to provide the limited brake range indicated by the portion 96 of the maximum brake capacity curve. Under these conditions in the full brake range part of the pressure will be due to the centrifugal head of the brake and part due to a positive charging pressure from pump 53. Since the pressure generated by the brake is low in this range only the excess pressure and fluid due to pump 53 will be relieved by the torque limiter valves and the brake chamber will be kept full.

Though several embodiments of the invention have been disclosed, it will be apparent to those skilled in the art that modifications may be made within the scope of the invention defined by the claims.

We claim:

1. In combination, a torque converter having a converter chamber with a converter inlet and outlet and a hydrodynamic brake having a brake chamber with a brake inlet and outlet, a fluid supply, means to deliver fluid through said converter inlet and said converter chamber under pressure to said converter outlet, and valve means interconnecting said converter outlet, said brake inlet and outlet and said fluid supply and in the brake on position connecting said brake outlet and converter outlet to said brake inlet, and in the brake off position connecting said brake outlet to said fluid supply and said converter outlet to said fluid supply.

2. In combination, a torque converter having a converter chamber with a converter inlet and outlet and a hydrodynamic brake having a brake chamber with a brake inlet and outlet, a fluid supply, means to deliver fluid through said converter inlet and said converter chamber under pressure to said converter outlet, and valve means interconnecting said converter outlet, said brake inlet and outlet and said fluid supply and in the brake on position connecting said brake outlet and converter outlet to said brake inlet and relieving excessive pressure to limit the capacity of the brake, and in the brake off position connecting said brake outlet to said fluid supply and said converter outlet to said fluid supply.

3. In combination, a torque converter having a converter chamber with a converter inlet and outlet and a hydrodynamic brake having a brake chamber with a brake inlet and outlet, a cooler, a fluid supply, means to deliver fluid through said converter inlet and said converter chamber under pressure to said converter outlet, valve means interconnecting said converter outlet, said brake inlet and outlet, said cooler, and said fluid supply and in the brake on position connecting said brake outlet and converter outlet through said cooler to said brake inlet and relieving excessive pressure to limit the capacity of the brake, and in the brake off position connecting said brake outlet to said fluid supply and said converter outlet through said cooler to said fluid supply.

4. In combination, a torque converter having a converter chamber with a converter inlet and outlet and a hydrodynamic brake having a brake chamber with a brake inlet and outlet, a fluid supply, means to deliver fluid under pressure from said fluid supply to said converter chamber inlet, a loop conduit connecting said brake outlet to said brake inlet, manually controlled valve means in said loop conduit having a first portion adjacent said brake outlet to block said loop conduit and vent said loop conduit to said fluid supply and a second portion adjacent said brake inlet to block said loop conduit and vent said loop conduit to said fluid supply in the brake off position and said first portion opening said loop conduit and closing the vent to said fluid supply and said second portion opening said loop conduit and closing the vent to said fluid supply in the brake on position, and said converter chamber outlet being connected to said loop circuit between said first and second valve portions.

5. In combination, a torque converter having a converter chamber with a converter inlet and outlet and a hydrodynamic brake having a brake chamber with a brake inlet and outlet, a fluid supply, means to deliver fluid under pressure from said fluid supply to said converter chamber inlet, a loop conduit connecting said brake outlet to said brake inlet, manually controlled valve means in said loop conduit having a first portion adjacent said brake outlet to block said loop conduit and vent said loop conduit to said fluid supply and a second portion adjacent said brake inlet to block said loop conduit and vent said loop conduit to said fluid supply in the brake off position and said first portion opening said loop conduit and closing the vent to said fluid supply and said second portion opening said loop conduit and closing the vent to said fluid supply in the brake on position, said converter chamber outlet being connected to said loop circuit between said first and second valve portions, and a relief valve in said loop conduit adjacent said brake outlet venting high pressure to said fluid supply to limit the capacity of the hydrodynamic brake.

6. In combination, a torque converter having a converter chamber and a hydrodynamic brake having a brake chamber, a fluid supply, means to deliver fluid under pressure from said fluid supply to said converter chamber, a cooler, a brake outlet line connecting said brake chamber to said cooler, a converter outlet line connecting said converter chamber to said brake outlet line, a brake inlet line connecting said cooler to said brake chamber, manually controlled valve means in said brake outlet and inlet lines to connect said brake outlet line and said brake inlet line to said fluid supply in the brake off position and said brake outlet line to said cooler and said brake inlet line to said brake chamber in the brake on position, and pressure controlled valve means to connect said brake outlet line to said fluid supply.

7. In a transmission, a torque converter having a converter chamber with an inlet and an outlet and hydrodynamic brake having a brake chamber with an inlet and an outlet and a rotor driven at a speed proportional to the converter speed, a hydraulic loop circuit connecting said brake chamber inlet and outlet, a cooler providing a restriction in said loop circuit dividing said loop circuit into an inlet portion and an outlet portion, means to supply a volume of fluid which is substantially constant at any given converter speed to said converter inlet, said converter outlet being connected to said outlet portion of said loop circuit, said outlet portion having a variable orifice valve closing said orifice in the brake full on position and fully opening said orifice in the brake off position to drain the loop circuit and partially opening said orifice in intermediate positions to partially release fluid from said loop circuit to provide partial braking, said outlet portion having a pressure release valve to release fluid from said hydraulic loop circuit to limit the maximum brake capacity, said inlet portion having a brake inlet valve having a brake on position permitting flow to said brake chamber and a brake off position blocking flow to said brake chamber, and a pressure relief valve in said outlet portion between said cooler and said brake inlet valve to relieve pressure when the brake chamber is full to limit brake capacity and pressure in the chamber when the brake chamber is full and to bypass converter flow when the brake inlet valve is closed.

8. In a transmission, a torque converter having a converter chamber with an inlet and an outlet and hydrodynamic brake having a brake chamber with an inlet and an outlet, a hydraulic loop circuit connecting said brake chamber inlet and outlet, a cooler providing a restriction in said loop circuit dividing said loop circuit into an inlet portion and an outlet portion, means to supply fluid to said converter inlet, said converter outlet being connected to said loop circuit, said outlet portion having valve means providing a variable orifice closing said orifice in the brake full on position to prevent removal of fluid from said loop circuit and fully opening said orifice in the brake off position to drain the loop circuit and partially opening said orifice in intermediate positions to partially release fluid from said loop circuit to provide partial braking, said outlet portion having pressure release means to release fluid from said hydraulic loop circuit to limit the maximum brake capacity, said inlet portion having a brake inlet valve means having a brake on position permitting flow to said brake chamber and a brake off position blocking flow to said brake chamber, and pressure relief means in said outlet portion between said cooler and said brake inlet valve to relieve pressure when the brake chamber is full to limit brake capacity and pressure in the chamber when the brake chamber is full and to by-pass converter flow when the brake inlet valve means is closed.

9. In a transmission, a torque converter having a converter chamber with an inlet and an outlet and hydrodynamic brake having a brake chamber with an inlet and an outlet, a hydraulic loop circuit connecting said inlet and outlet, a cooler providing a restriction in said loop circuit dividing said loop circuit into an inlet portion and an outlet portion, means to supply a volume of fluid which is substantially constant at any given brake speed to said converter inlet, said converter outlet being connected to said loop circuit, said outlet portion having valve means closing said orifice in the brake full on position to prevent release of fluid from said loop circuit and opening said valve means in the brake off position to drain the loop circuit, said inlet portion having a brake inlet valve having a brake on position permitting flow to said brake chamber and a brake off position blocking flow to said brake chamber, and a pressure relief valve in said outlet portion between said cooler and said brake inlet valve to relieve pressure when the brake chamber is full to limit brake capacity and pressure in the chamber when the brake chamber is full and to by-pass converter flow when the brake inlet valve is closed.

10. The invention defined in claim 1 and said valve means including bypass means to increase or decrease the flow through said brake inlet to respectively increase or decrease the capacity of said hydrodynamic brake.

11. The invention defined in claim 1 and said valve means including variable flow means effective in some brake-on positions to connect said brake outlet for variable flow to said fluid supply to increase or decrease the flow to said brake chamber to respectively increase or decrease the capacity of said hydrodynamic brake.

12. The invention defined in claim 1 and said valve means including variable flow means effective in some brake-on positions to connect said brake outlet for variable flow to said fluid supply to increase or decrease the flow to said brake chamber to respectively increase or decrease the capacity of said hydrodynamic brake and means to limit the maximum pressure in said brake chamber to limit the maximum capacity of said hydrodynamic brake.

13. The invention defined in claim 1 and said valve means including means to limit pressure in said torque converter.

14. The invention defined in claim 1 and said valve means including a pressure relief valve effective in the brake-on and brake-off position of said valve means to limit the pressure in said torque converter.

15. The invention defined in claim 1 and means to limit the pressure in said torque converter chamber and to limit the pressure in said brake chamber to limit the capacity of said hydrodynamic brake.

16. The invention defined in claim 1 and said valve means including a check valve in said converter outlet to prevent flow from said brake outlet to said converter chamber.

17. The invention defined in claim 1 and said valve means including a check valve connecting said brake outlet to said converter outlet and preventing flow from said converter outlet to said brake outlet.

18. The invention defined in claim 1, and said valve means providing a restriction in the brake-on position connecting said brake outlet and converter outlet to said brake inlet and providing a restriction in said brake-off position only in the connection of said torque converter outlet to said fluid supply.

19. The invention defined in claim 1 and said valve means having a fixed restriction located in said brake-on position in the connection between said converter and brake outlets and said brake inlet and a variable orifice located in said brake-on position between said brake outlet and said fluid supply.

20. The invention defined in claim 1 and a cooler, and said valve means in said brake-on position connecting said brake outlet and converter outlet through said cooler to said brake inlet and in said brake-off position connecting said brake outlet to said fluid supply and said converter outlet through said cooler to said fluid supply.

21. The invention defined in claim 1 and said valve means including bypass means to increase or decrease the flow through said brake outlet to respectively decrease or increase the capacity of the brake.

22. The invention defined in claim 1 and said valve means including bypass means to increase or decrease the flow through said brake outlet and simultaneously respectively decrease or increase the flow through said brake inlet to respectively decrease or increase the capacity of said hydrodynamic brake.

References Cited in the file of this patent

UNITED STATES PATENTS

| | | |
|---|---|---|
| 2,208,074 | Holz | July 16, 1940 |
| 2,236,556 | Wunderle | Apr. 1, 1941 |
| 2,238,786 | Warman | Apr. 15, 1941 |
| 2,250,702 | Canaan | July 29, 1941 |
| 2,349,350 | Jandasek | May 23, 1944 |
| 2,601,627 | Price | June 24, 1952 |
| 2,626,019 | Kisbey | Jan. 20, 1953 |